United States Patent [15] 3,642,288

Camras [45] Feb. 15, 1972

[54] TAPE CARTRIDGE WITH AUXILIARY SPRING BIASING ELEMENTS

[72] Inventor: Marvin Camras, Glencoe, Ill.

[73] Assignee: IIT Research Institute, Chicago, Ill.

[22] Filed: Mar. 10, 1969

[21] Appl. No.: 806,347

[52] U.S. Cl. ..................274/4 B, 242/55.19 A, 179/100.2 Z, 274/11 B

[51] Int. Cl. ..................................................G11b 23/06

[58] Field of Search .....................179/100.2 Z; 242/55.19 A; 274/4 B, 4 C, 11 B, 11 C

[56] References Cited

UNITED STATES PATENTS 2,876,005 3/1959 Eash ..................................179/100.2

3,287,508 11/1966 Morrison ...........................179/100.2

*Primary Examiner*—Bernard Konick
*Assistant Examiner*—J. Russell Goudeau
*Attorney*—Hill, Sherman, Meroni, Gross & Simpson

[57] ABSTRACT

An endless loop magnetic tape cartridge compatible with existing players which have a single laterally acting retention roller, the cartridge containing an independent longitudinal bias element acting on the retention roller and forwardly biasing the cartridge by reaction. Controlled lateral bias may also be provided. Preferably the cartridge is formed in two halves of configuration to receive and retain the bias element therebetween.

14 Claims, 4 Drawing Figures

PATENTED FEB 15 1972

3,642,288

INVENTOR.

Marvin Camras

BY Hill, Sherman, Meroni, Gross & Simpson ATTORNEYS

TAPE CARTRIDGE WITH AUXILIARY SPRING BIASING ELEMENTS

SUMMARY OF THE INVENTION

It is an object of the present invention to provide an endless loop magnetic tape cartridge compatible with existing player machines but wherein a definite accurate forward bias of the cartridge toward the capstan is provided independently of the conventional single laterally acting retention roller.

A further object of the invention is to provide a cartridge which is adapted to be loaded longitudinally into a receiving space which has a laterally acting retention roller but wherein the cartridge is configured such that the laterally acting retention roller cannot laterally bias the cartridge, so that strong side forces between the cartridge and its receiving unit are avoided.

Another object of the invention is to provide a compatible endless loop magnetic tape cartridge enabling reduced or negligible side forces so as to ensure an accurate pressure engagement between the capstan and the pressure roll during transducing operation.

Still another object of the invention is to provide a compatible endless loop magnetic tape cartridge which provides essentially free adjustability of the cartridge within its receiving space to accommodate to slight irregularities such as in the capstan roll, for improved transducing operation in comparison with the prior art wedged-in-place cartridge configuration.

Yet another object of the invention is to provide a cartridge configuration which can be simply and economically molded and wherein the novel elements are extremely easily assembled with the remaining parts of the cartridge.

Other objects, features and advantages of the present invention will be apparent from the following detailed description taken in connection with the accompanying drawings.

DESCRIPTION OF THE PREFERRED EMBODIMENTS

Figures 1, 2, 3, 4:
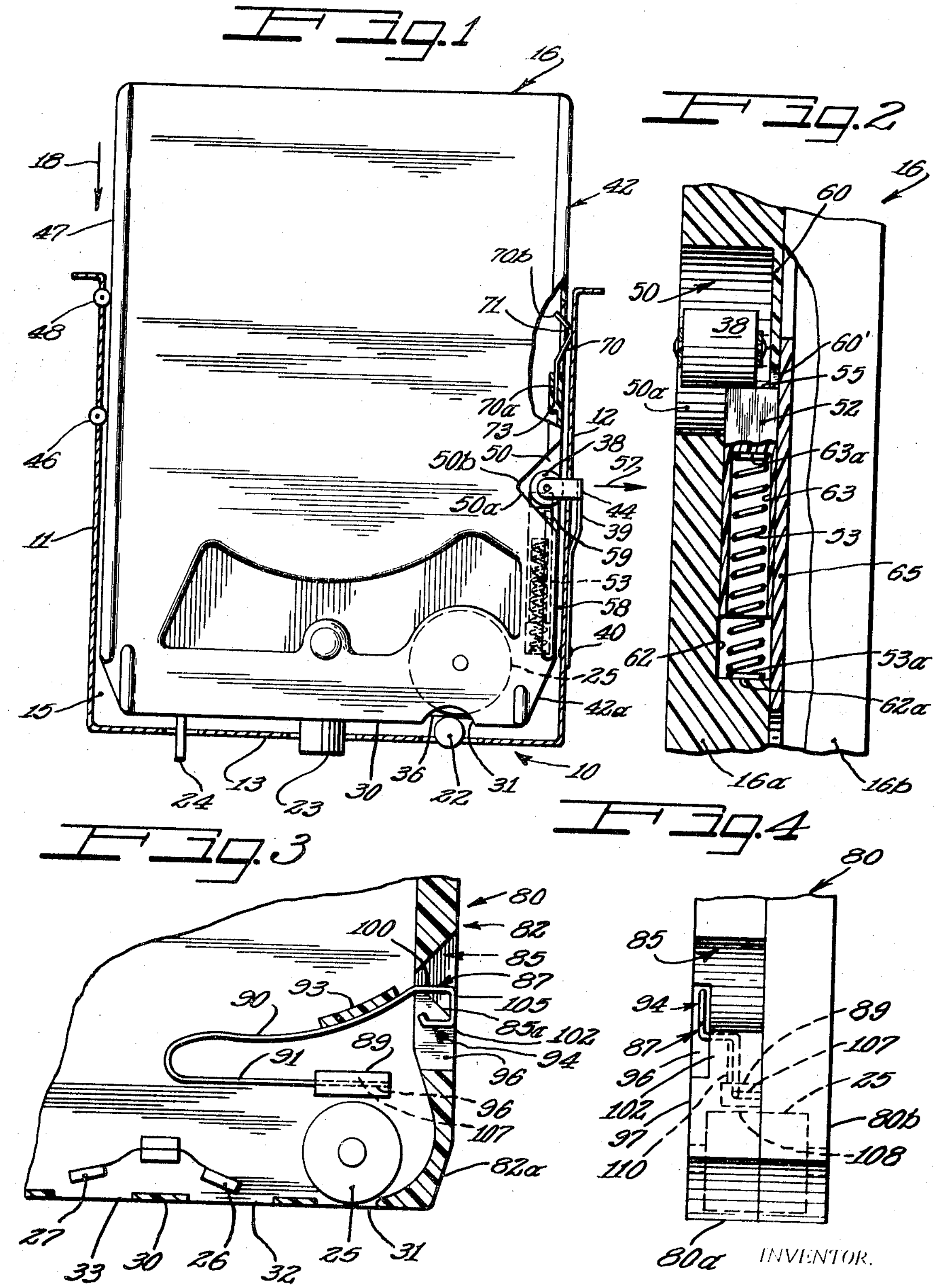
FIG. 1 is a somewhat diagrammatic horizontal sectional view with certain portions of the cartridge broken away and in section.
FIG. 2 is an enlarged fragmentary longitudinal sectional view of the cartridge illustrating preferred details of construction.
FIG. 3 is a somewhat diagrammatic fragmentary horizontal sectional view illustrating a modified cartridge in accordance with the present invention.
FIG. 4 is a somewhat diagrammatic fragmentary side elevational view of the cartridge of FIG. 3.

Referring to FIG. 1, portions of a conventional endless loop tape cartridge player unit 10 are illustrated including sidewalls 11 and 12 and front wall 13 defining a cartridge receiving space 15. A cartridge such as indicated at 16 is moved in a longitudinally forward direction such as indicated by arrow 18 until the cartridge reaches an operative position within the player unit. The player unit 10 further includes certain elements such as a capstan driver roller 22, a magnetic transducer head 23 and a tape engaging element 24 which are to be cooperatively associated with conventional elements within the cartridge such as pressure roller 25, and pressure pads 26 and 27, FIG. 3. As seen in FIGS. 1 and 3, the cartridge conventionally includes a front wall 30 with open regions such as indicated at 31, 32 and 33, FIG. 3, for exposing the magnetic tape 36, FIG. 1, to contact with the elements 22–24. The element 24 may include electrical contact elements which are bridged by a conductive strip on the magnetic tape 36 so as to control indexing movement of the transducer head 23 for scanning of the successive channels recorded on the tape 36.

In the conventional player mechanism, the sidewall 12 is provided with a laterally acting retention roller 38 which is carried on a relatively strong spring arm 39 secured to the side 12 by fastening means such as indicated at 40. In the conventional system, a sloping forward wall portion 42*a* of longitudinal sidewall 42 of cartridge 16 engages roller 38 as the cartridge is loaded into the receiving space 15, camming the roller from a retention position within the receiving space in a laterally outward direction. Then, with a conventional cartridge configuration, the lateral biasing spring 39 forces the roller 38 laterally inwardly along a sloping intermediate wall portion of the longitudinal sidewall corresponding to sidewall 42 so as to wedge the conventional cartridge forwardly and laterally and in effect lock the cartridge within the receiving space. In order to provide the necessary amount of forward bias with this conventional arrangement, the spring force of the arm 39 is necessarily relatively great with the result that there is a strong lateral force exerted on the cartridge giving rise to friction which prevents the reliable maintenance of an accurate pressure between the capstan 22 and pressure roller such as indicated at 25.

In the conventional player, means such as an extension on bracket portion 44 of spring arm 39 limits the lateral inward movement of the retention roller 38 in the absence of the cartridge so as to define what is herein termed a retention position, but which position would not actually be attained with conventional wedge-type retention action. In the conventional cartridge player, a guide roller such as indicated at 46 is provided for cooperation with the opposite sidewall 47 of cartridge 16. Some commercial machines also include additional rollers as indicated at 48 for use in conjunction with the cartridge so as to provide even more accurate and reliable positioning of such cartridge.

The cartridge 16 in accordance with the present invention is provided with a recess 50 extending into the longitudinal sidewall 42, but the recess 50 is of such a configuration that the sloping wall portion 50*a* thereof is clear of any substantial contact with the retention roller 38 in the retention position of the roller shown in FIG. 1 so that the retention roller produces no substantial lateral force on the cartridge 16 and no substantial forward force on the cartridge such as is present in the conventional arrangement.

In place of the conventional wedge-type arrangement, the cartridge 16 is provided with a longitudinal biasing element 52 which is provided with a predetermined longitudinal biasing force by means of a compression spring 53 acting to urge the element 52 longitudinally rearwardly against retention roller 38 in operative position of the cartridge. As shown in FIG. 2 the retention element 52 is provided with a rear retention roller engaging face 55 which has essentially a planar rectangular configuration with the plane of the end face 55 lying at right angles to the direction of movement of the element 52, and parallel to the lateral direction of movement of retention roller 38 indicated by arrow 57 in FIG. 1. Thus, the roller 38 does not exert a lateral biasing force on the cartridge even by virtue of its contact with the end face 55 of the longitudinal biasing element. On the other hand, when the biasing element 52 has its rear face 55 in engagement with the retention roller 38 as shown in FIGS. 1 and 2, the forward end 53*a* of compression spring 53 will transmit a reaction forward biasing force on the cartridge 16.

As the cartridge 16 is inserted into the receiving space 15, the retention roller 38 will ride along the longitudinal sidewall section 58 and along the side edge face 59 of retention element 52 until such time as the central axis of the roller 38 is beyond the edge face 55 of biasing element 52. At this time, the force exerted by spring 53 is sufficiently less than the force exerted by spring arm 39 that the spring arm 39 will force the roller 38 to its retention position shown in FIG. 1 with the spring 53 under substantial compression so as to exert a substantial longitudinal biasing force on the cartridge 16, maintaining stable pressure engagement of the pressure roll 25 in relation to tape 36 and capstan 22. As the cartridge is being loaded, the longitudinal biasing element 52 will be maintained in its extreme rearward position by virtue of the force of compression spring 53, with the rear face 55 engaging the stop provided by edge face 60' of the wall 60 of the cartridge. It will be noted that the stop 60 is located substantially forwardly of the central axis of retention roller 38 so as to facilitate the lateral inward movement of the retention roller to its retention position, forcing the biasing element 52 to the active position illustrated in FIGS. 1 and 2.

As best seen in FIG. 2, the cartridge 16 is preferably made in two parts 16*a* and 16*b* which are secured in mating relationship to form a housing for the conventional elements of the cartridge. The part 16*a* includes a longitudinally extending notch 62 for slidably receiving the biasing element 52, the forward end 53*a* of compression spring 53 being bottomed against forward wall 62*a* of the notch 62. It will be observed that the biasing element 52 and the notch 62 are of substantially rectangular cross sections, the biasing element 52 having a longitudinal cylindrical bore 63 with a rear end face 63*a* seating the forward end of compression spring 53. The other half 16*b* of cartridge 16 is preferably provided with a wall portion 65 overlying the entire extent of notch 62 so as to confine the biasing element 52 for longitudinal reciprocal movement only when the halves 16*a* and 16*b* are assembled.

It will further be observed from FIG. 2 that when the cartridge 16 is to be shifted rearwardly to a standby position or removed entirely from the receiving space 15, the rearward movement of the cartridge 16 will cause the retention roller 38 to press the biasing element 52 into its receiving notch 62 until the retention roller 38 engages the sloping sidewall portion 50*a* of recess 50. Further rearward movement of the cartridge 16 will then wedge the retention roller 38 laterally outwardly in the direction of arrow 57, FIG. 1, the roller 38 rolling on the rear edge face 55 of biasing element 52 and pressing the biasing element further in the retracting direction into the notch 62 until such time as the retention element 38 is in rolling engagement with the portion 58 of the longitudinal sidewall 42 of cartridge 16. The cartridge may be retained in a standby position partially retracted from the receiving space 15, or removal of the cartridge 16 may be continued, the retention roller 38 riding on wall portion 58 and then on sloping front wall portion 42*a* as the cartridge is removed from the player unit.

As illustrated in FIG. 1, if desired, cartridge 16 may be provided with a controlled amount of lateral bias by means of a spring finger 70 acting through an aperture 71 in sidewall 42 to engage the side 12 of the transducer or player unit 10. The rollers 46 and 48 coact with the lateral bias spring 71 so as to provide a controlled amount of friction which is sufficiently small to ensure reliable maintenance of accurate pressure between the capstan 22 and pressure roll 25 under impetus of longitudinal biasing spring 53. With or without the provision of the lateral bias spring 71, the cartridge 16 is so constructed as to be essentially freely movable within the receiving space 15 so as to adjust to or follow slight irregularities in the orientation or position of the capstan 22.

The forward leg 70*a* of spring finger 70 may fit in a notch 73 which is closed by material of the upper half 16*b* of the cartridge 16 in a manner entirely similar to the closure of notch 62. The forward free edge 70*b* of lateral bias finger 70 may be arranged so as to limit the lateral outward movement of the biasing finger 70 when the cartridge is removed from the player unit. The spring finger 70 thus provides a substantially negligible protrusion from the normal contour of the cartridge. In other respects, the overall dimensions of the cartridge 16 may be essentially identical to the corresponding dimensions of a conventional eight-track endless loop magnetic tape cartridge.

By way of summary of operation for the embodiment of FIGS. 1 and 2, as the cartridge 16 is inserted into the receiving space 15, forward wall portion 42*a* cams the retention roller 38 laterally outwardly, after which the retention roller rides along the wall portion 58 and the edge face 59 of longitudinal bias element 52. When the centerline of roller 38 is behind the end face 55 of bias element 52 with the end face 55 against stop edge 60′, FIG. 2, the spring arm 39 exerts sufficient force to drive retention roller 38 into recess 50 and to drive bias element 52 forwardly against the action of compression spring 53. The retention roller 38 assumes a retention position as indicated in FIGS. 1 and 2 where the retention roller 38 is free of any substantial contact with the sloping wall portion 50*a* of recess 50, the forward bias on the cartridge being determined exclusively by the action of compression spring 53.

In retracting the cartridge from the operative position shown in FIGS. 1 and 2, the bias element 52 is driven into its receiving notch 62, FIG. 2, and the roller 58 wedged out of recess 50 by virtue of its rolling contact with sloping wall 50*a*, FIG. 1.

FIGS. 3 and 4 illustrate a modified embodiment which is of even greater simplicity than the embodiment of FIGS. 1 and 2. In this embodiment, a cartridge 80 is similar to cartridge 16 except in the particulars indicated and includes a longitudinal sidewall 82 corresponding to longitudinal sidewall 42 and a sloping forward wall portion 82*a* having the function of wall portion 42*a*, FIG. 1. Recess 85 corresponds in its relationship to retention roller 38 to the particulars given with respect to recess 50 of the previous embodiment so that the retention roller 38 is free of any substantial contact with the walls of recess 85 and particularly with the sloping forward wall 85*a* thereof.

In this embodiment, a longitudinal bias element 87 is in the form of an elongated wire spring, for example of circular cross section, extending in a generally hairpin configuration from a mounting block 89. The rear leg 90 of the bias element 87 is urged rearwardly relative to the forward leg 91 by virtue of the resilience of the material, the rear leg 90 being confined against rearward movement by means of stop wall portion 93 when the cartridge is removed from the machine. The free end 94 of the bias element is longitudinally movable within a notch 96 at the bottom face 97 of the lower section 80*a* of cartridge 80.

It will be noted that the centerline of retention roller 38 is generally in alignment with the bottom portion 50*b* of notch 50 in FIG. 1, and similarly the notch 85 is arranged so that the center of the retention roller 38 will be in alignment with point 85*b* at the bottom of notch 85, FIG. 3. Thus, the center axis of rotation of the retention roller 38 will be displaced rearwardly relative to the roller engaging face 100 of bias element 87. Further notch 96 is relatively shallow in comparison with the axial extent of the retention roller 38 so that the retention roller will ride on face 102 of sidewall 82 of cartridge 80 as the cartridge is inserted into the receiving space. As the roller 38 comes into lateral alignment with sloping face 85*a*, it will engage longitudinal length portion 105 of the bias element 87 and will be prevented from moving into the recess 85 until the central axis of the retention roller 38 has moved beyond the laterally extending portion 100 of the bias element 87. Thereupon, as in the previous embodiment, the force of the spring arm 39 will be sufficient to force the retention roller 38 into the notch 85 forcing the free end portion 94 of bias element 87 forwardly. The resultant compression of the bias element 87 will produce a reaction force at the mounting block 89 which is in substantially direct alignment behind the axis of pressure roller 25 so that the pressure roller 25 is biased in the longitudinal forward direction from a point on the cartridge directly in alignment with the capstan 22.

As in the previous embodiment, when it is desired to remove the cartridge 80, the cartridge is removed rearwardly causing the retention roller 38 to move the free end 94 further forwardly into the notch 96, the retention roller 38 being cammed laterally outwardly by virtue of the sloping wall portion 85*a*. Thereafter, the portion 102 of the longitudinal sidewall 82 of the cartridge 80 will maintain the retention roller 38 in its laterally outward position as the cartridge is removed from the machine.

The mounting block 89 is provided with a longitudinally extending notch 107 for receiving a portion 91*a* of forward leg 91 of the bias element 87. The notch 107 may receive a retaining finger 108 of corresponding configuration which is integral with the upper part 80*b* of the cartridge. Thus as the halves 80*a* and 80*b* are mated, the projecting retaining finger 108 is progressively moved into the notch 107 of block 89 to firmly retain the end portion 91*a* of bias element 87 at the bottom of the notch. As indicated in FIG. 4, the part 80*a* may be provided with a ledge partially indicated at 110 which overlies a portion of the rear leg 90 of the bias element so that the bias element is firmly retained at the desired level within the notch 96 as indicated in FIG. 4. The configuration of ledge 110 is such, of course that the free end 94 of the bias element is movable in the forward direction as described and such that the bias element 87 is conveniently assembled and retained with the lower half 80*a* prior to its assembly with the upper half 80*b* and the consequent complete retention of the bias element at its desired location within the housing defined by the parts 80*a* and 80*b*.

Summarizing the operation for the embodiment of FIGS. 3 and 4, as the cartridge 80 is inserted into the receiving space such as indicated at 15 in FIG. 1, the sloping forward wall portion 82*a* wedges the retention roller 38 laterally outwardly in the direction of arrow 57, FIG. 1. The roller 38 then rides on surface portion 102 of sidewall 82 and along the longitudinally extending portion 105 of the bias element spring wire 87. When the center axis of retention roller 38 is beyond the laterally extending portion 100 of bias element 87, spring arm 39, FIG. 1, of the retention roller 38 forces the retention roller into the recess 85 and forces the free end 94 of bias element 87 in the forward direction along notch 96, FIGS. 3 and 4. The compression of legs 90 and 91 of bias element 87 results in a reaction being exerted against the mounting block 89, FIG. 3, so as to bias the pressure roller 25 in the forward longitudinal direction and maintain the desired stable pressure engagement of the pressure roller 25 with the tape and capstan element 22 in the same way as shown in FIG. 1.

In removing the cartridge 80, the retention roller 38 further compresses the free end 94 of the bias element 87 in the forward direction along notch 96, the retention roller 38 riding along the sloping wall 85*a* and along the wall portion 102 as the cartridge is completely removed from the player or transducer unit generally designated by the reference numeral 10 in FIG. 1.

The description of FIGS. 1 and 2 and the other descriptive matter herein is specifically applicable to the embodiment of FIGS. 3 and 4 except as inconsistent therewith, and the longitudinal bias element 87 provides the desired definite accurate forward spring bias toward the capstan and avoids the strong side forces between the cartridge and the transducer unit and provides the desired essentially free adjustability of the cartridge within the receiving space as in the preceding embodiment. A lateral bias element such as spring finger 70, FIG. 1, may be provided for the embodiment of FIGS. 3 and 4 as well. It will be understood that in the embodiment of FIGS. 3 and 4, the notch 96 is sufficiently deep, and the free end 94 of the bias element 87 is located at a level such as to reliably insure its full contact with the retention roller 38 regardless of any manufacturing tolerances. As generally indicated in FIG. 2, the sloping wall portion such as 50*a* in FIG. 2 will generally overlap the retention roller 38 for a substantial proportion of the axial extent thereof so that there will be reliable firm contact between the retention roller 38 and the sloping wall portion 50*a* or 85*a* as the cartridge is retracted from the receiving space. As indicated in FIG. 2, the longitudinal bias element 52 may be arranged to engage a substantial portion of the longitudinal extent of the retention roller 38, or with respect to the embodiment of FIGS. 3 and 4, the longitudinal bias element may be arranged to engage the retention roller at a region spaced inwardly from the margins of the roller by a substantial distance. Thus firm engagement is insured in spite of any manufacturing tolerances or any slight deflection of the engaging parts from their respective normal operating planes.

One cartridge in accordance with the present invention which was actually constructed and successfully operated for the reproduction of musical selections was entirely comparable to the embodiment of FIGS. 1 and 2 except that the longitudinal bias element 52 was located within an internal longitudinal recess formed in the wall of a conventional eight-track cartridge. For the purposes of actual commercial production, it is considered that the embodiment of FIGS. 1 and 2 is preferable over the recessed wall embodiments. The location of the longitudinal bias element in the prototype corresponded more nearly to the location of the free end 94 ot longitudinal bias element 87 in FIGS. 3 and 4. A second prototype which was formed from a conventional cartridge conformed essentially to that illustrated in FIGS. 3 and 4 and was successively operated for the reproduction of music. Both prototypes were found to be entirely reliable and consistent in their operation when repeatedly inserted into a conventional player machine, and the prototypes were considered to avoid the disadvantages noted herein for the conventional cartridge when associated with the conventional player.

In each of the embodiments the changes in deflection of the spring (53 or 87) due to minor variations in dimensions of the cartridge and receiving space (as a result of manufacturing tolerances and the like) is substantially negligible in its effect on the biasing force, so that the force of the biasing member (52 or 94) is substantially constant regardless of such minor variations.

In FIG. 1, the laterally acting spring element 70 may be replaced by a fixed button of the same external configuration as presented by spring 70 in FIG. 1 or the width dimension can be increased to give the same effect as such a fixed button. As a further alternative such a button may be mounted on a spring arm such as 70*a*.

The configuration of FIGS. 1 and 2 exactly as illustrated has been constructed and operated for the reproduction of music. This embodiment was found to be entirely reliable and consistent in its operation when repeatedly inserted into a conventional player.

The plunger, cavity, and spring are shown in simple form for easy molding and assembly, but may be modified as for example with protrusions or depressions for guiding, stopping, or coupling with the external abutment. Other materials may be substituted. A portion of the plunger may even extend rearward of the side notch to give it additional support.

In place of hairpin spring 87, FIG. 3, a cantilever spring could be provided anchored at the side of cartridge 80 opposite the side with recess 85 and extending across the width dimension of the cartridge and into recess 85 at the position of free end 94. The spring would then have an end configuration as shown at 94, but would extend from portion 100 directly across the width of the cartridge. Each of the bias elements described herein would present the substantially constant biasing force in spite of minor dimensional variations as previously mentioned, and would accommodate adjustment of the cartridge in contrast to the wedged in place retention of the prior art.

It will be apparent that many modifications and variations may be effected without departing from the scope of the novel concepts of the present invention.

I claim as my invention:

1. A tape cartridge for use in a transducer unit of the type having a tape driving member, a longitudinally extended cartridge receiving space defined between a pair of spaced-apart sidewalls for accommodating longitudinal movement of said cartridge into operative relationship to the tape driving member and a laterally biased retention element disposed on one side of the cartridge receiving space for retaining the cartridge longitudinally in operative relation with the transducer unit, said cartridge comprising a tape record medium within said cartridge, a pressure roll within said cartridge for cooperating with the tape driving member to drive said tape record medium, and a spring at one side thereof for engagement with one of the sidewalls forming the cartridge receiving space to urge said cartridge in a lateral direction against the opposite one of the sidewalls when the cartridge is retained in the receiving space.

2. A tape cartridge for use in a transducer unit of the type having a tape driving member, a longitudinally extended cartridge receiving space formed between spaced-apart sidewalls for accommodating longitudinal movement of said cartridge into operative relationship to the tape driving member, and a laterally biased retention element disposed on one side of the cartridge receiving space for retaining the cartridge longitudinally in operative relation with the transducer unit, said cartridge comprising a tape record medium within said cartridge, a pressure roll within said cartridge for cooperating with the tape driving member to drive said tape record medium and a button protruding at one side thereof for engagement with one of the sidewalls forming the cartridge receiving space to laterally position the cartridge in the receiving space.

3. A cartridge adapted for cooperation with a transducer unit having a cartridge receiving space and having an abutment that holds the cartridge in said space, said cartridge having a biasing member carried therewith for urging the cartridge in a given direction when the cartridge is retained in said receiving space by said abutment, said cartridge also having a recess arranged to receive said abutment to retain said cartridge in said receiving space and means for automatically forcing the abutment out of said recess when the cartridge is removed from the receiving space.

4. The cartridge of claim 3 with said forcing means comprising a sloping wall portion of the cartridge.

5. A tape cartridge adapted for cooperation with a transducer unit that has a tape driving capstan, a longitudinally extended cartridge receiving space for accommodating longitudinal movement of a cartridge into operative relationship to the capstan, and a single laterally biased retention element disposed at one side of said cartridge receiving space and biased toward a cartridge retaining position within said cartridge receiving space, said cartridge comprising a housing having a front wall with an open region therein to expose a portion of a tape path therein which is in alignment with said capstan to accommodate driving engagement of the capstan with a tape record medium extending along said path, said housing having a longitudinal sidewall for extension along one side of the cartridge receiving space when the cartridge is inserted therein, said housing having a recess extending from its longitudinal sidewall at a position which is in lateral alignment with the retention element when the cartridge is in operative relationship to the capstan, said recess providing clearance accommodating lateral movement of the retention element into its retaining position under the impetus of its lateral bias, and a longitudinal bias element in said housing for coaction with said retention element and having a longitudinally rearwardly acting biasing means for urging the bias element rearwardly against said retention element, said biasing means exerting a substantial biasing force which by reaction acts in a forward longitudinal direction on the cartridge to maintain said cartridge in stable pressure engagement with said capstan during transducing operation.

6. The cartridge of claim 5 with said longitudinal bias element being movable into said recess in the absence of said retention element, and said bias and retention elements having cooperating configurations such that the retention element will move the bias element in the forward longitudinal direction as the retention element moves laterally into said recess.

7. The cartridge of claim 6 with said biasing means urging the bias element rearwardly with a force less than that exerted by the lateral bias of said retention element, to accommodate automatic forward longitudinal movement of the bias element by the retention element, when the cartridge is inserted in the receiving space.

8. A tape cartridge for use in a transducer unit of the type having a tape driving member, a longitudinally extended cartridge receiving space for accommodating longitudinal movement of said cartridge into operative relationship to the tape driving member, and a laterally biased retention element disposed on one side of the cartridge receiving space, said tape cartridge comprising a tape record medium within said cartridge, a pressure roll within said cartridge for cooperating with the tape driving member to drive said tape record medium, and a biasing member carried with said cartridge and cooperating with the retension element for urging said cartridge into drive relation with the tape driving member whenever said cartridge is retained in the cartridge receiving space by the retention element.

9. The cartridge of claim 8 with said biasing member urging said cartridge into a given position with a force determined by said biasing member.

10. The cartridge of claim 8 with said biasing member urging said cartridge into a given position with a force determined by said biasing member, the force of said biasing member being substantially constant regardless of minor variations in dimensions of the cartridge and receiving space.

11. The cartridge of claim 8 with said biasing member being within the confines of the overall cartridge configuration exclusive of said biasing member.

12. The cartridge of claim 8 with said cartridge having a recess arranged to receive the retention member to retain said cartridge in said receiving space.

13. The cartridge of claim 8 with said biasing member comprising a spring urged plunger.

14. The cartridge of claim 8 with said biasing member comprising a bendable spring element.

* * * * *